UNITED STATES PATENT OFFICE.

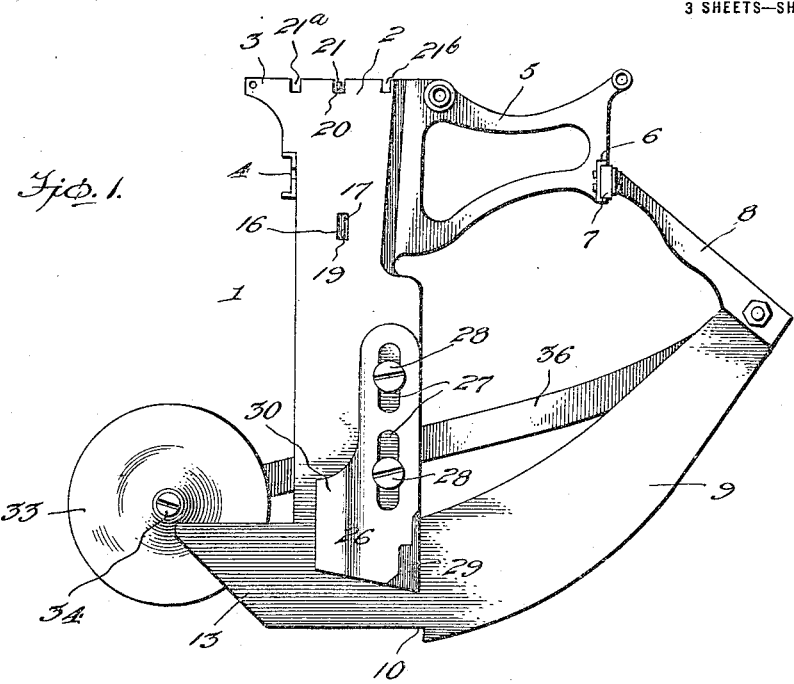
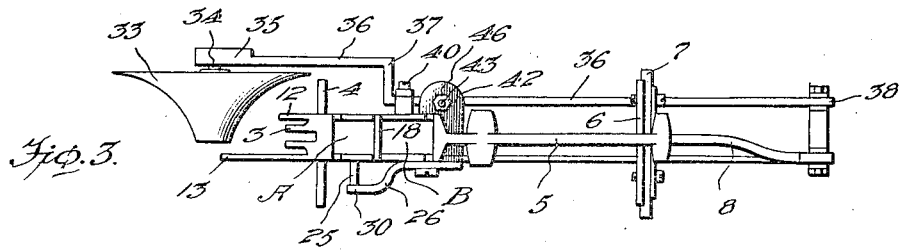
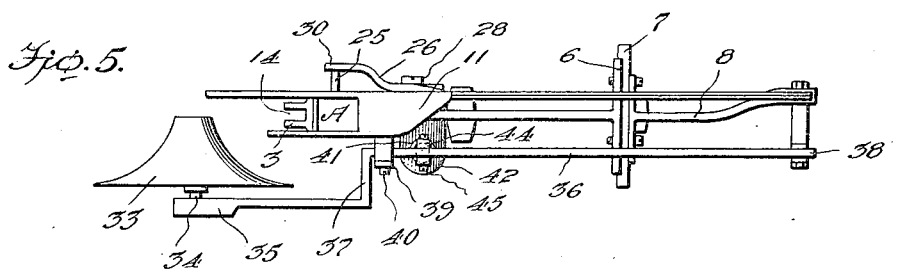

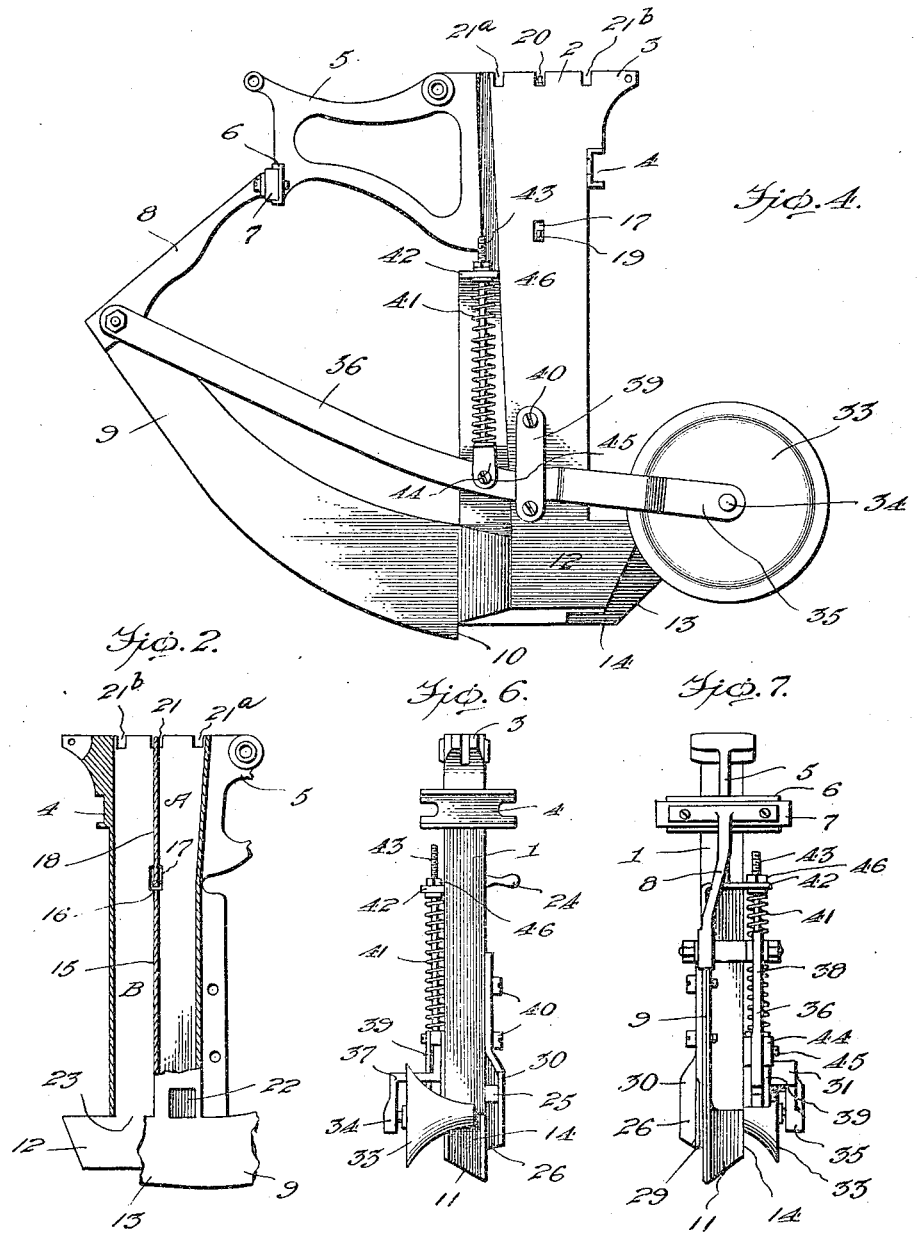

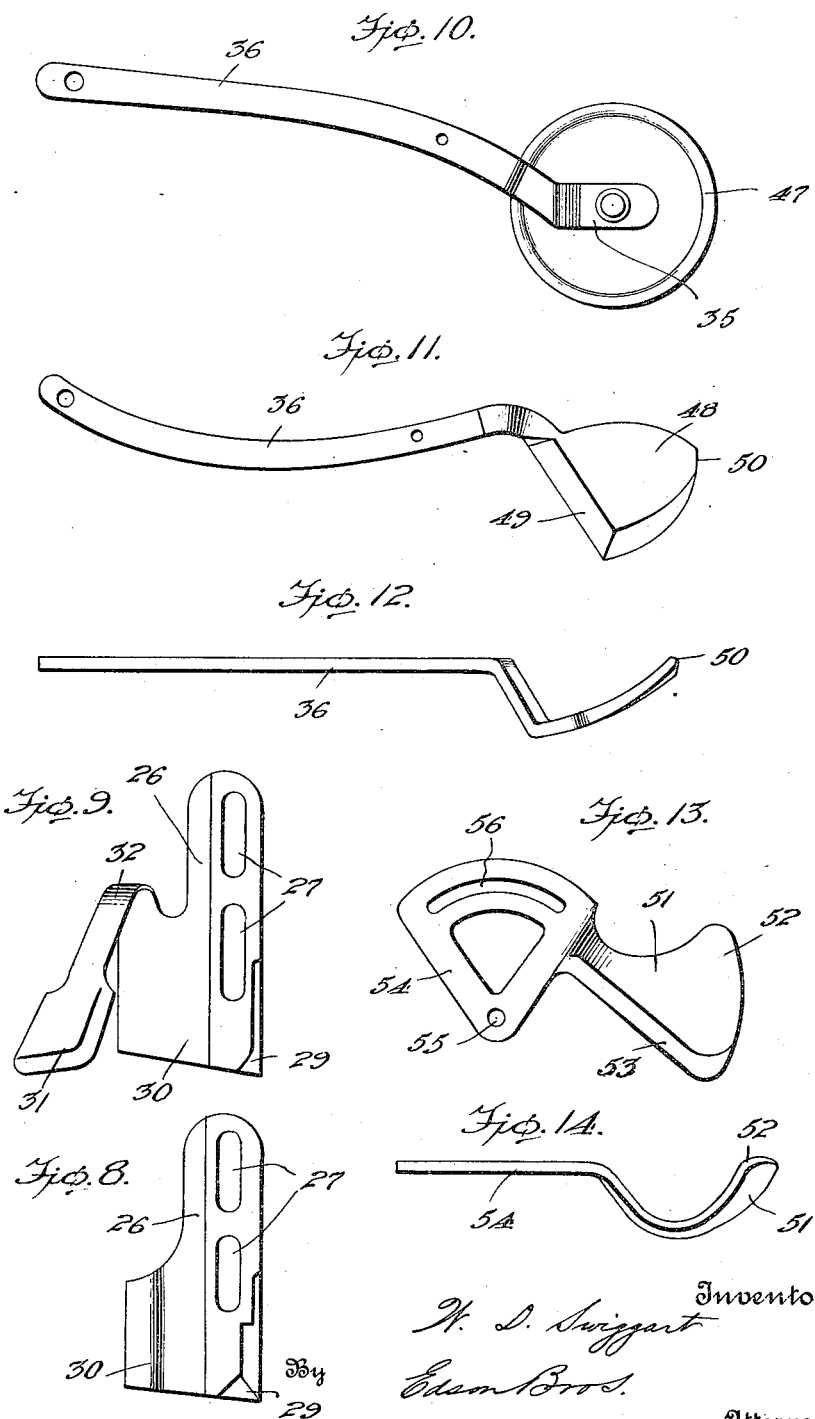

WILL D. SWIGGART, OF FULTON, KENTUCKY.

PLANTER.

1,281,873.  Specification of Letters Patent.  Patented Oct. 15, 1918.

Application filed November 29, 1916. Serial No. 134,141.

*To all whom it may concern:*

Be it known that I, WILL D. SWIGGART, a citizen of the United States, residing at Fulton, in the county of Fulton and State of Kentucky, have invented certain new and useful Improvements in Planters; and I do hereby declare the following to be a full, clear, and exact description of the invention, such as will enable others skilled in the art to which it appertains to make and use the same.

This invention is a seed planter adapted to facilitate the planting of a plurality of seeds simultaneously at different levels of soil or to apply fertilizer at the same time that the seed is planted.

The invention has for its object to plant seed at different levels in the soil and to thereafter distribute soil over the seed so planted, the soil engaging means being adjustably mounted so that greater or lesser amounts of soil may be passed over the seed deposited in the furrows.

The invention comprises a standard provided with a plurality of conduits associated with which is a manually controlled gate for directing material through each of the conduits simultaneously, or wholly through one or the other of the conduits. Each conduit is provided with a discharge port adjacent the runner, and associated with the runner and the standard are soil engaging elements which serve to direct the soil over the seed planted through the discharge ports. These soil engaging devices may be adjustably mounted so that they engage a greater or lesser amount of soil, and they may employ a shovel or rotatable disk to distribute the soil over the furrows previously formed.

Various types of soil engaging devices may be employed in connection with the discharge ports of the conduits, and these soil engaging devices may be adjustably mounted in fixed relation on the standard, or may be pivotally mounted for relative movement on the standard and be maintained in a predetermined position by resilient devices.

Further objects and advantages of the invention will become apparent from the following detail description thereof taken in connection with the accompanying drawings.

While preferred embodiments of the invention are disclosed in the drawings, it is to be understood that the structures therein set forth are for the purposes of illustration only, and not as defining the limits of the invention.

In the drawings:

Figure 1 is a side elevation disclosing an adjustable soil engaging element positioned over one of the discharge ports.

Fig. 2 is a vertical sectional view through the standard disclosing the discharge port at the side of the standard as well as the opening for the other discharge port and the pivoted gate.

Fig. 3 is a top plan view of the assembled structure.

Fig. 4 is a side elevation disclosing the standard with the means for engaging a pivoted soil engaging element.

Fig. 5 is a bottom plan view of the assembled structure.

Fig. 6 is a rear elevation of the assembled structure.

Fig. 7 is a front elevation of the assembled structure, parts being in section.

Fig. 8 is a detail view of a port protector adapted to be mounted on the standard.

Fig. 9 is a similar view of a port protector provided with a shovel to engage the soil.

Fig. 10 is a detail view of a soil engaging element provided with a disk soil engaging member.

Fig. 11 is a detail view of a soil engaging element provided with a fixed shovel which is adapted to be mounted on the resilient supporting element of the standard.

Fig. 12 is a detail view of the soil engaging element of Fig. 11 showing the curvature of the shovel.

Figs. 13 and 14 show another embodiment of the soil engaging shovel.

The seed planter is adapted to be used with any suitable type of receptacle for the various seeds to be planted, or the fertilizer to be deposited. The standard 1 may be in the form of a casting, or may be of a plurality of parts suitably united. The upper end of the casting, indicated at 2, may be of any suitable form to coöperate with the hoppers (not shown) or seed containers which may be employed in connection with the planter herein described.

In the drawings, there is shown a projection, indicated at 3, to receive a lock bolt for holding the seed box or hopper in its proper position on top of the standard 1. The standard may be provided also with a suitable seat, indicated at 4, for connecting with a rail, not shown, of a frame of the planting means to which the structure herein illustrated is to be applied. Connected also with the standard 1 is shown a bracket 5 provided with bearings for a feed shaft and an inner part of the hopper box hinge, which may be of the ordinary construction, and are not herein illustrated. This bracket 5 may be provided with a seat 6 to receive a section, indicated at 7, of a front frame of a planting machine and connecting with the bracket 5 there may be provided a forearm 8 which extends from the bracket 5 to a runner indicated at 9.

The runner 9 may be of any suitable form or construction and is shown provided with a notched lower portion 10. The runner is preferably thickened at 11 in rear of the notched portion 10 to provide a broad bearing surface in alinement with the standard 1. This bearing surface is bifurcated to provide a short wing 12 and a long wing 13, between which is positioned a channel indicated at 14. The bearing surface 11 is preferably inclined from the horizontal, and from the longer wing 13 upwardly toward the shorter wing 12 so that the longer wing 13 is substantially of a depth equal to the lowest part of the runner 9. If desired, the rear of the longer wing 13 may be formed with an angular terminal, the angle being of any suitable degree, such for example, as forty-five degrees, which extends from the base of the wing near the terminus of wing 12 upwardly to the rearward extremity of the longer wing 13.

The standard 1 is preferably provided with a division wall 15 which extends from the lower portion of the standard, or may extend from the channel 14 of the runner to a predetermined point, such as 16, of the standard. At this point 16, the standard may be provided with any suitable means, shown in the drawings as a plurality of elongated slots 17 serving as seats for a pivotal material director, shown in the form of a gate 18.

This gate 18 may be of any suitable material and construction, but shown as a sheet of metal having projections at the upper and lower ends thereof, indicated at 19 and 20. These projections may be integral with the sheet 18, or otherwise secured thereto. The lower projections 19 are designed to extend into the elongated seats 17 of the standard 1 to serve as pivotal supporting means for the gate 18, while the upper projections 20 are designed to be positioned in seats 21 formed at the upper portion 2 of the standard. Any number of these seats 21 may be provided, but as the standard 1 is shown constructed with only two conduits, the drawings merely disclose three of the seats 21. When the gate 18 has been moved so that the projections 20 engage the central seats 21, the material, such as seed, or fertilizer, may then pass into the plurality of conduits A and B, the material of conduit A passing out through port 22 of the standard 1, while the material of conduit B may pass out through the port formed at 23 in the chamber 14 of the base and between the wings 12 and 13 of the runner.

If desired, the gate 18 may be provided with any suitable means, such as a handle 24 to engage one of the projections 19 through the aperture 17 for directing the gate to open both of the conduits A and B, or to close one of the conduits A or B by moving the gate upon its pivot at 17 so that the projections 20 will pass into seat 21$^a$ to close conduit A or into seat 21$^b$ to close conduit B. It will be understood that any other suitable means may be empolyed in lieu of the handle 24 to change the position of the gate 18 within the standard.

On one side of the standard 1 there may be employed a spacing element 25 which may be integral with the standard 1, if desired. This spacing element is preferably positioned adjacent to the port 22 and is designed to maintain the port free from soil by its engagement with a suitable soil engaging element indicated at 26. This soil engaging element may be in the form of a plate of the type shown in Fig. 8 having a plurality of slots 27 to permit of the vertical adjustment of the plate 26 on the standard 1 by means of bolts 28 or similar devices passing through the slots 27. The lower portion of the plate 26 may be beveled as at 29 to present the least resistance to the material passing against this portion of the plate, while another portion of the plate, indicated at 30, may be bent outwardly from the plane of the plate containing the slots 27 to form a guard to direct the soil away from the port 22. The spacing element 25 is designed to contact with the portion 30 of the plate 26, thereby providing an open channel through which the seed may be passed into contact with the furrow provided in the soil to receive the seed. If desired, this plate 26 may be provided with a shovel attachment 31, shown more particularly in Fig. 9, the shovel being connected to the plate 26 by means of a curved arm 32, the inclination of the shovel 31 to the body 26 of the plate being of a suitable degree to throw the soil with which the shovel 31 contacts over the furrow which has received the seed deposited through port 22. By providing the slots 27 in the plate 26, this plate may be adjusted to different heights relative to the standard 1 and runner 9 and thereby regulate the depth of planting the seed in the soil, by opening a furrow the depth the plate is to be set.

On the opposite side of the standard, there is disclosed a soil engaging element which is adjustably mounted upon the standard. In Figs. 4 and 5 this soil engaging element is shown in the form of a disk 33 which is mounted upon a suitable bearing 34 carried by a section 35 of an arm 36. This bearing 34 may be of any desired form. The section 35 is joined to the arm 36 by an angular portion 37. The arm 36 is shown pivotally mounted at its end 38 to the runner 9, while the section of the arm 36 adjacent the angular portion 37 is guided in its vertical movement by a guide plate 39. This guide plate may be removably mounted upon a suitable support carried by the standard 1, such removable fastening means being shown as screws 40. The guide plate provides a channeled space for the vertical movement of the arm 36. To maintain the soil engaging element 33 at a predetermined position relative to the channel 14 between the wings of the runner 9, there may be provided a suitable resilient element, indicated at 41, to exert its energy against the arm 36. The standard 1 is shown provided with a bracket 42 which supports a rod 43 having a saddle 44 swiveled thereto. This saddle is designed to engage the arm 36 near the guide plate 39, and is preferably detachably mounted to the arm by any suitable means such as a bolt 45. The rod 43 is preferably threaded, and extends through the bracket 42. This bracket also serves to mount a sleeve nut 46 which is designed to engage the threaded portion of the rod 42 for the purpose of advancing or retracting the saddle 44 relative to the bracket 42. Interposed between the bracket 42 and the saddle 44 may be positioned the spring 41 heretofore referred to. It will be observed that the sleeve nut 46 may be rotated to determine the operative position of the rotatable disk 33. In Figs. 4 and 5, the soil engaging member 33 is shown as an arcuate cone disk. In Fig. 10, however, the soil engaging element is similar in all substantial respects to that shown in Fig. 4, with the exception that the section 35 of the arm 36 is positioned at an angle to the plane of the arm 36 and serves to mount an ordinary concavo-convex disk 47. In lieu of the soil engaging elements shown in Figs. 4 and 10, there may be provided a fixed soil contacting member indicated at 48 in Figs. 11 and 12, and which may be termed a shovel. This shovel 48 is shown mounted upon the usual arm 36 and is preferably inclined relative to the plane of the arm 36. The blade of the shovel is preferably distorted so that it is substantially spoon shaped on its contacting surface, whereby soil which is engaged by the knife edge 49 of the shovel will be thrown over by the curved over portion 50 of the shovel to cover up the furrow previously made by the runner.

In Figs. 13 and 14, a similar shovel is shown wherein the blade is indicated at 51, a curved over upper portion at 52 and the soil cutting portion at 53. In this structure, however, the arm 36 of the other embodiments of the soil engaging elements is omitted, and in lieu thereof, there is provided a triangular supporting element 54 which is pivotally mounted at 55 to a lower bolt 56 which formerly supported the guide plate 45 of the standard. It is to be understood that when the element 54 is employed on the standard 1, the resilient element 41 and its supporting member 42 are removed, and the bolt 40 is passed through the arcuate slot 56 of the member 54. By this arrangement, the bolt 40 may be loosened to permit of the vertical adjustment of the shovel 51, after which the bolt 40 may be tightened to maintain the shovel in a fixed position on the standard.

Various other changes and alterations may be made in the structure herein set forth, particularly as to the soil engaging members which coöperate with the discharge ports of the conduits, and the right is reserved to make such changes and alterations as fairly fall within the scope of the appended claims.

Having thus described the invention, what I claim as new is:

1. In a device of the class described, a standard having a plurality of conduits discharging from different faces of the standard at different levels, a runner for the standard and soil engaging means coöperating with each discharge port for directing soil over seed planted through the discharge ports.

2. In a device of the class described, a standard having a plurality of conduits, said conduits having discharge ports at different positions on the standard, a runner for the standard and soil engaging means coöperating with each discharge port for directing soil over seed planted through the discharge ports, said soil engaging means being adjustably mounted relative to the standard.

3. In a device of the class described, a standard having a plurality of conduits, said conduits having discharge ports at different positions on the standard, a runner for the standard, soil engaging means coöperating with each discharge port for directing soil over seed planted through the discharge ports, and means carried by the standard to mount the soil engaging means at various positions relative to the discharge ports.

4. In a device of the class described, a standard having a plurality of conduits, said conduits having discharge ports at different positions on the standard, a runner for the standard, soil engaging means coöperating with each discharge port for directing soil over seed planted through the discharge ports, and means to adjust the soil engaging means at various vertical positions on the standard.

5. In a device of the class described, a standard having a conduit and a runner connected with the standard, the runner terminating in a plurality of wings adjacent the conduit to permit the material flowing through the conduit to pass between the wings, said wings extending beyond the rear face of the standard and operating to prevent the loose soil from falling prematurely into the furrow, and soil engaging means mounted on the standard and positioned in coöperative relation to the wings.

6. In a device of the class described, a standard having a conduit and a runner connected with the standard, the base of the runner being thickened to coincide with the standard and terminating in a plurality of wings adjacent the conduit, one of the wings being longer than the other wing, the base of the runner being beveled toward the longer wing.

7. In a device of the class described, a standard having a conduit and a runner connected with the standard, the base of the runner being thickened to coincide with the standard and terminating in a plurality of wings adjacent the conduit, one of the wings being longer than the other wing and cut off at an angle so that the base of the longer wing terminates substantially with the termination of the shorter wing and the upper portion thereof extends beyond said shorter wing, a portion of the bottom face of the runner being beveled toward the longer wing.

8. In a device of the class described, a standard terminating in a runner, a conduit terminating in a discharge port in a side of the runner, and a wing plate mounted for vertical adjustment on the standard, said wing plate having an outwardly deflected portion to provide a channel for the passage of material from the conduit into the soil.

9. In a device of the class described, a standard having a conduit terminating in a discharge port, and a wing plate mounted over said port for adjustment to various positions on the standard, said wing plate being provided with a shovel positioned at an angle to the plane of the standard, said shovel designed to engage the soil and distribute it over the material being discharged from the conduit.

10. In a device of the class described, a standard having a conduit discharging from a port in a vertical face thereof and a soil engaging plate adjustably mounted on the standard near the discharge port, said plate being bent outward to form a guard to direct the soil away from said port.

11. In a device of the class described, a standard having a plurality of material conduits discharging at different positions from the standard, a runner for the standard, an adjustable soil engaging plate carried by the standard to coöperate with one discharge port, and a second soil engaging element pivotally connected to the runner to coöperate with the other discharge port.

12. In a device of the class described, a standard, a runner, a soil engaging element having an arm pivotally mounted on the runner, a guide carried by the standard through which the arm operates, and resilient means to retain the arm in a predetermined position.

13. In a device of the class described, a standard provided with a conduit having a discharge port, a runner for the standard, means to engage the soil adjacent said port to deflect the soil therefrom, means to direct the soil to its former position, and means to resiliently mount the soil directing means upon the standard.

14. In a device of the class described, a standard provided with a plurality of conduits having discharge ports, a runner for the standard, an adjustable soil deflector positioned over one of said ports, means carried thereby to direct the soil to its former position, and a rotatable soil contacting member to coöperate with said other discharge port.

15. In a device of the class described, a standard having a plurality of conduits formed therein, said standard terminating in a runner, said conduits terminating in discharge ports for directing soil over seed planted through the discharge ports on adjacent sides of the standard, and soil engaging means to coöperate with the ports.

16. In a device of the class described, a standard having a plurality of conduits formed therein, said standard terminating in a runner, said conduits terminating in individual discharge ports for directing soil over seed planted through the discharge ports positioned on adjacent sides of the standard adjacent the lower extremity thereof, and separate soil engaging means to coöperate with each of said ports.

In testimony whereof, I affix my signature.

WILL D. SWIGGART.

Copies of this patent may be obtained for five cents each, by addressing the "Commissioner of Patents, Washington, D. C."